Patented Dec. 30, 1941

2,267,831

UNITED STATES PATENT OFFICE 2,267,831

SILICA REMOVING PROCESS

Otto Liebknecht, Babelsberg, near Berlin, and Lothar Gerb, Berlin-Charlottenburg, Germany, assignors to The Permutit Company, New York, N. Y., a corporation of Delaware No Drawing. Application December 24, 1938, Serial No. 247,724. In Germany January 26, 1938

2 Claims. (Cl. 210—23)

This invention relates to a process of removing silica from water; and it comprises a process of treating water with hydroxides of iron and aluminum at a pH above 8.0, the hydroxides of iron and aluminum being prepared in situ by electrolytic means or by using a metal hydroxide to precipitate an iron and aluminum compound which does not increase the total dissolved solids in the water. Depending upon the chemical characteristics of the raw water, it may be necessary to add an earth alkali hydroxide to raise the pH above 8.0, before, during or after the introduction of the iron and aluminum hydroxide into the water.

An achieved object of the invention is the removal of silica from water without a simultaneous increase in the total dissolved mineral solids in the water, as for example occurs when the water is treated with relatively large amounts of ferric sulfate and alkali. The introduction of dissolved mineral solids during silica removal is usually deleterious, especially when the treated water is used for boiler feed purposes.

Another achieved object of the invention is the economical production of the iron and aluminum hydroxides by a method which does not require too much technical skill, supervision and maintenance.

The boiler feed water requirements for the present high pressure boilers, 700 lbs. per sq. in. and higher, are very exacting and the silica present in many natural, especially underground, waters exceeds the permissible silica tolerance for waters, which may be used in these high pressure plants. The hydroxides of iron and aluminum can be used for removing silica from water since these hydroxides have the property of binding the silica, probably by adsorption. The hydroxides can be produced in the water in which case the salts of these metals are either added to the water under suitable conditions to effect the precipitation of the metal as hydroxide or the metals are introduced into the water as hydroxides by electrolytic means by using the metals as anodes and maintaining a hydroxyl ion concentration suitable for precipitating the metal as the hydroxide. The hydroxides or metal hydroxide gels may be produced externally and added to the water.

Because of its cheapness, ferric hydroxide appears to deserve preference for silica removal. In the development of this silica removal process it has been found that the amount of ferric hydroxide required to treat the water is rather large, being of the magnitude of 150 to 200 milligrams per liter expressed as metallic iron. The high quantities of iron may cause some operating difficulties. The pH range in which ferric hydroxide can be used for silica removal is rather wide, it being only necessary to bring about a complete precipitation of the ferric hydroxide, and can be extended upwardly without impairing the silica removal.

When aluminum hydroxide is used in place of ferric hydroxide, much smaller quantities by weight are required, namely: 15 to 20 milligrams per liter, expressed as metallic aluminum, in other words, about ten per cent of the weight of iron required. When using aluminum hydroxide the pH range must be kept within comparatively narrow limits since below as well as above these limits silica removal by the aluminum hydroxide is less efficient, i. e. more silica remains in the treated water. The preferred pH range for good silica removal with aluminum hydroxide appears to be 8.0 to 8.3.

It has been found that the silica removal obtained when using mixtures of aluminum and ferric hydroxides is at least as good as when using the individual hydroxides and the quantity of each hydroxide in the mixture is considerably less than the quantity of the individual hydroxide required. When using a mixture of aluminum and iron hydroxides, the amount of aluminum hydroxide required is 4 to 10 milligrams per liter, preferably 5 to 7 milligrams per liter and the amount of ferric hydroxide required is 25 to 50 milligrams per liter, preferably 30 to 40 milligrams per liter. The above mentioned quantities of aluminum and iron hydroxides are expressed as metallic aluminum and iron, respectively. It will be noted by comparison of all the above mentioned figures that the quantities of the respective hydroxides used in the mixture are a quarter and a third of the amounts of aluminum and iron hydroxides which are required individually. The results obtained from a mixture of aluminum and iron hydroxides are substantially better than the sum of the effects of the individual substances.

The chief advantage is that the quantity of the hydroxide used in comparison with the quantity of iron required alone, is very much smaller. Although, the quantity required in comparison with the amount of aluminum hydroxide used alone is not favorable, there is, however, a very substantial improvement because the pH range in which the most favorable silica removal effect can be obtained is very much extended so that it is much easier to obtain the favorable pH for good silica removal. The mixture of aluminum and ferric hydroxide settles more rapidly than the aluminum hydroxide alone so that the separation of the hydroxide mixture in the settling tank takes place more quickly and completely than when using aluminum hydroxide alone.

In order to obtain good silica removal the origin of the metal hydroxide is not especially important. The use of salts of the metals is, however, not to be recommended because the anions of these salts cause an undesirable increase in the dissolved solids in the water after the necessary adjustment to the desired pH. The use of the sulfates of aluminum and iron is not recommended because of the abnormal increase in the dissolved solids in the treated water. The use of separately produced hydroxides is recommended because their use avoids a large increase in the dissolved mineral solids in the treated water. The basic salts of aluminum and iron which contain only a small fraction of the anions of the normal salts of aluminum and iron are recommended because the dissolved solid content of the water is not unduly increased.

It is advantageous to carry out the electrolytic production of the hydroxides by using these metals as anodes. The effective anode surface of each of the metals used is preferably in the ratio of each of the hydroxides desired in the hydroxide mixture. The quantity of current used is sufficient to yield the desired amount of the hydroxide required to effect good silica removal. In addition to the advantage that no new salt formation occurs, there are the added advantages of economy in the use of the hydroxide mixture and simplicity of the equipment and its operation.

The necessary pH adjustment is obtained by the addition of a hydroxide of earth alkalies after the production of the hydroxide. Caustic lime or caustic magnesia are suitable earth alkalies for obtaining the pH adjustment. When the hydroxide is produced electrolytically it may be advisable to aerate the water to obtain a complete oxidation of the ferrous salt to a ferric salt.

The removal of the precipitated hydroxide may be carried out in any of the well-known ways, i. e. settling or filtration through a bed of non-siliceous sand, marble, etc.

In a specific embodiment of this invention, a water containing 13 milligrams silica ($SiO_2$) per liter was treated with a mixture of aluminum and iron hydroxides containing 6 milligrams per liter aluminum and 40 milligrams per liter iron. The aluminum and iron hydroxides were produced in the water electrolytically. After the electrolytic production of the aluminum and iron in the water, the pH was adjusted to 8.3 by the addition of lime water. The water was then aerated, passed into a settling tank and allowed to settle and finally passed through a filter containing marble as the filter medium. The silica in the treated water was reduced to one milligram per liter, a very satisfactory figure not easily obtained by other methods.

What we claim is:

1. A process of removing silica from water which comprises treating the water with aluminum and ferric hydroxides in a ratio of 4 to 10 milligrams per liter of aluminum hydroxide expressed as metallic aluminum and 25 to 50 milligrams per liter of ferric hydroxide expressed as metallic iron to 10 to 15 milligrams per liter of silica present in the water to be treated, and separating the water and precipitate.

2. A process for removing silica from water which comprises producing in situ electrolytically a mixture of aluminum and ferric hydroxides, treating the water at a pH between 8 and 9 with said mixture of hydroxides, reducing the dissolved solids content of the water by said treatment, and separating the water and precipitate.

OTTO LIEBKNECHT.
LOTHAR GERB.